(12) United States Patent
Jung et al.

(10) Patent No.: US 11,964,458 B2
(45) Date of Patent: *Apr. 23, 2024

(54) METHOD FOR TEACHING AND/OR OPERATING A LAMINATING METHOD AND/OR A LAMINATING DEVICE, METHOD FOR LAMINATING A FILM ELEMENT, METHOD FOR INSTALLING AND RETROFITTING A LAMINATING DEVICE FOR LAMINATING A FILM ELEMENT, DEVICE FOR LAMINATING A FILM ELEMENT, AND TEACHING STATION AND FILM ELEMENT

(71) Applicant: LISA DRAXLMAIER GMBH, Vilsbiburg (DE)

(72) Inventors: Andreas Jung, Laufen (DE); Hubert Rehrl, Teisendorf (DE); Josef Rehrl, Teisendorf (DE)

(73) Assignee: DRÄXLMAIER GROUP, Vilsbiburg (DE)

( * ) Notice: Subject to any disclaimer, the term of this patent is extended or adjusted under 35 U.S.C. 154(b) by 190 days.

This patent is subject to a terminal disclaimer.

(21) Appl. No.: 17/293,492

(22) PCT Filed: Nov. 13, 2019

(86) PCT No.: PCT/DE2019/100978
§ 371 (c)(1),
(2) Date: Nov. 23, 2021

(87) PCT Pub. No.: WO2020/098880
PCT Pub. Date: May 22, 2020

(65) Prior Publication Data
US 2022/0080715 A1    Mar. 17, 2022

(30) Foreign Application Priority Data

Nov. 13, 2018   (DE) .......................... 102018128460.8

(51) Int. Cl.
B32B 41/00    (2006.01)
B32B 37/00    (2006.01)
B32B 38/18    (2006.01)

(52) U.S. Cl.
CPC ...... *B32B 37/0046* (2013.01); *B32B 38/1808* (2013.01); *B32B 38/1841* (2013.01); *B32B 41/00* (2013.01); *B32B 2309/70* (2013.01)

(58) Field of Classification Search
CPC ............ B32B 37/0046; B32B 37/1808; B32B 38/1841; B32B 41/00; B32B 2309/70; B32B 38/1833; B29C 63/024; B29C 63/02
(Continued)

(56) References Cited

U.S. PATENT DOCUMENTS

| | | | |
|---|---|---|---|
| 2012/0186730 A1* | 7/2012 | Shindo | B29C 70/38 156/160 |
| 2017/0320310 A1 | 11/2017 | Nally et al. | |

(Continued)

FOREIGN PATENT DOCUMENTS

| | | | |
|---|---|---|---|
| WO | WO0067991 | 11/2000 | |
| WO | WO2017/215684 A1 | 12/2017 | |
| WO | WO-2017215684 A1 * | 12/2017 | ............. B29C 51/04 |

OTHER PUBLICATIONS

P. Kopacek, "Computer Aided Development for Robot Control", Dec. 31, 1989, pp. 39-45, Computer Aided Design in Control Systems.

(Continued)

*Primary Examiner* — Michael N Orlando
*Assistant Examiner* — Joshel Rivera
(74) *Attorney, Agent, or Firm* — BelayIP

(57) ABSTRACT

The present disclosure relates to a method for teaching a laminating method as well as operating a laminating device, the both being for laminating a film element on a substrate part, in which designated path routes, in particular designated path curves, along which grippers for gripping the film element are subsequently moved to laminate the film element, are determined and taught by way of CAD data of the substrate part as well as the film element.

20 Claims, 3 Drawing Sheets

(58) Field of Classification Search
USPC ................... 156/60, 64, 350, 351, 378, 379
See application file for complete search history.

(56) References Cited

U.S. PATENT DOCUMENTS

2020/0215742 A1* 7/2020 Rehrl ...................... B29C 63/02
2021/0394503 A1* 12/2021 Jung ....................... B32B 41/00

OTHER PUBLICATIONS

Anonymous, "Artist Studio Software—Cevotec GmbH" Mar. 17, 2018, with German test and English language translation.
Anonymous, "An Integrated CAD/CAM System for Automated Composite Manufacture", Aug. 31, 1996.
The Robot Report Staff, "New Scale Robotics Introduces Precision Gripper for Cobots by The Robot Report Staff", Aug. 31, 2018.
Virginia Franke Kleit et al., "Building Technologically Based Online Trust . . . " Abingdon, Oct. 2, 2017, pp. 319-329.
Oliver Grenier-Lafond, "Program a Robot, No Training Required, Thanks to Robotiq's New Software", Jun. 15, 2016.

* cited by examiner

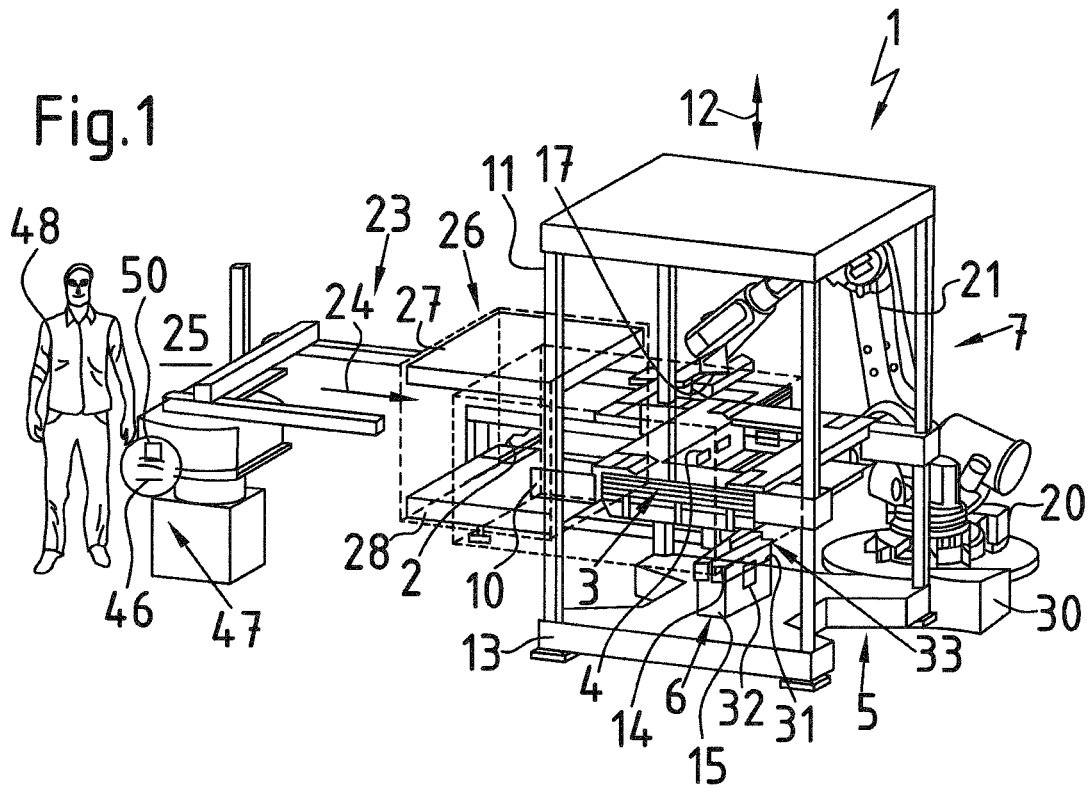

METHOD FOR TEACHING AND/OR OPERATING A LAMINATING METHOD AND/OR A LAMINATING DEVICE, METHOD FOR LAMINATING A FILM ELEMENT, METHOD FOR INSTALLING AND RETROFITTING A LAMINATING DEVICE FOR LAMINATING A FILM ELEMENT, DEVICE FOR LAMINATING A FILM ELEMENT, AND TEACHING STATION AND FILM ELEMENT

CROSS REFERENCE TO RELATED APPLICATIONS

This application is a national phase application of International Application No. PCT/DE2019/100978, filed on Nov. 13, 2019, and further claims the priority benefit of German Application 102018128460.8, filed on Nov. 13, 2018, the content of both of which is incorporated herein by reference.

BACKGROUND OF THE PRESENT DISCLOSURE

The present disclosure relates to a method for teaching and/or operating a laminating method and/or a laminating device for laminating a film element on a carrier part.

The present disclosure further relates to a method for laminating a film element, in which the film element is gripped by means of grippers, and in which grippers are respectively motor-driven along path routes, in particular along path curves, to position the film element in relation to the carrier part for a lamination device.

The present disclosure further relates to a method for installing or converting a laminating method and/or a laminating device for laminating a film element with grippers for gripping the film element.

The present disclosure further relates to a device for laminating a film element with grippers for gripping the film element and with a control device for controlling a motor-driven method of grippers along their respective path routes, in particular along path curves.

The present disclosure further relates to a teaching station.

The present disclosure further relates to a film element for lamination to a carrier part.

Special generic methods and devices for laminating a film element are already known from the prior art.

For example, a method and device for laminating a film element to a carrier part are known from WO 2017/215684 A1. The device disclosed there comprises, among other things, a plurality of grippers for gripping the film element, wherein the grippers being multi-axially displaceable in order to be able to adapt the film part more precisely to the contour of a component to be laminated.

BRIEF SUMMARY OF THE INVENTION

The present disclosure is based on the task of further developing, in particular, generic methods and devices. In particular, the aim of the present disclosure is to save film material. The present disclosure further relates to the possibility of laminating a film element without distortion.

According to a first aspect, an object of the present disclosure is solved by a method for teaching a laminating method and/or a laminating device for laminating a film element on a carrier part, wherein designated working positions, designated path routes, in particular designated path curves along which grippers for gripping the film element are later moved for laminating the film element, are determined and taught by means of CAD data of the carrier part and/or of the film element.

With the first solution proposed here, allows grippers to adjust path routes or path curves to be set extremely precisely for grippers when laminating the film element to the carrier part later, so that the carrier part can also be laminated with the film element correspondingly extremely precisely.

By means of the present method, path routes or path curves required for a lamination process are determined and taught in dependence on corresponding CAD data.

In addition, particularly exact movements and/or positioning of grippers relative to the carrier part and also other components of a laminating tool, such as a carrier part receptacle, a sealing device of a pressure differencing device, a punching device or the like, can be simulated and determined.

Cumulatively or alternatively, suitable data for generating and teaching designated path routes or path curves can also be generated and taught on the basis of data, in particular CAD data, of a laminating tool.

It is understood that suitable data, such as CAD data, can be provided in various ways for the present method. Advantageously, corresponding interfaces are provided on a laminating device, in particular on a vacuum laminating device, for the method to be carried out in order to process the required data there, in particular to read it out or read it in electronically.

It is particularly useful if the CAD data comprises at least one data record for a shape, in particular a contour, such as for example a processing into a surface to be laminated, of the carrier part. Such data sets of the carrier part, in particular data on a free-form surface associated therewith, which is to be laminated, enable the generation of particularly and precisely designated path routes or path curves for the grippers.

In this respect, a very advantageous method variant provides that designated path routes or path curves depend on a shape, a contour, a winding of a surface to be covered, a free-form surface or the like.

Cumulatively or alternatively, the designated path routes or path curves can also be based on CAD data of the film element, in particular on corresponding data on the outer contour or edge contour of the film element.

In this respect, it is advantageous to determine and teach designated path routes, in particular designated path curves depending on a shape, in particular an outer contour or an edge contour, of the film element.

In the sense of the present disclosure, the term "CAD data" means any electronically processable data, which can contain and provide useful information to generate and, in particular, to teach designated path routes or path curves. This includes, in particular, data from a computer-aided geometric model or the like, in particular, 3D CAD data.

The term "path route or path curve" essentially describes at least one line along which grippers can be moved to grip a film element on a laminating device. In this respect, the present path route or path curve is laminating path routes or path curves, along which laminating film grippers can be moved along for later laminating.

In a simple case, a single line or path line formulates approximately an essentially one-dimensional path route or path curve, which extends with a longitudinal extension in the direction of the line course. In this case, this simple line has an essentially one-dimensional extension component in longitudinal extension.

For example, the line or path route or path curve refers to the center of gravity of a gripper.

A path route or path curve generated or taught in the sense of the present disclosure can be more precise with regard to a linear longitudinal extension, but can also have an additional transverse extension and thus have a two-dimensional extension component.

In the sense of the present disclosure, a line is preferably realized by a transverse extension transverse to its longitudinal extent, as a result of which a plane is formed along which a gripper can move in space.

Alternatively, however, a path route or path curve can also be formulated by a plurality of lines which are arranged side by side with respect to their longitudinal extensions to realize suitable path level with respect to the present disclosure.

At this point, it should be noted that the terms "path route or path curve" can also formulate corresponding path levels in addition to path lines.

A path route or path curve can be determined and taught particularly advantageously by means of matrix data, which provide information on three-dimensional spatial orientation.

In the sense of the present disclosure, the term "designated" describes any future gripper positions in which grippers for a later lamination process can initially be arranged in a simulated manner. These can be, in particular, designated path routes, path curves, path lines path levels etc.

In the sense of the present disclosure, the term "teaching" describes a process, in particular with regard to a laminating method or a laminating device, in which individual or preferably all grippers involved in a lamination process are guided and arranged outside of an automated lamination process, pre-designated path routes or path curves.

In other words, this means that the grippers can be guided by human interaction.

The present disclosure allows designated path routes or path curves positions to be entered in a controller or the like in a very simple manner, preferably stored and, moreover, stored permanently or temporally at least for as long as desired in the controller.

According to a second aspect, the aim of the present disclosure is also achieved by a method for teaching a method and/or a device for laminating a film element on a carrier part, wherein designated path routes, in particular path curves along in which grippers for gripping the film element are later moved into the film element for laminating the film element, are taught by means of individual spatial coordinates.

Cumulatively or alternatively to the first solution, individual spatial coordinates can be provided in the second proposed solution, on which the designated path routes or path curves are partially or completely supported.

By entering such spatial coordinates, designated path routes or path curves can additionally be individually adapted, for example as an alternative to CAD data or cumulatively to existing CAD data.

For example, it is possible to manipulate one or more designated path routes or path curves created on the basis of CAD data by independent, preferably manually entered spatial coordinates.

The term "space coordinates" describes places on a laminating device, in particular on a vacuum laminating device, which are located, in particular, directly next to a laminating tool or in a laminating room of the laminating device.

These spatial coordinates can be fixed in place, but can also be movable locally depending on time. Dynamically changeable designated path routes or path curves can also be generated, in addition to statically provided designated path routes or path curves.

It is advantageous to generate designated path routes, in particular, designated path curves by means of at least two or more spatial co-ordinates, preferably by means of a starting point and an end point and a plurality of waypoints arranged in between.

Preferably, several spatial coordinates can be used for generating and teaching designated path routes or path curves. The more such spatial coordinates are entered, the more accurate designated path routes or path curves can be provided.

In order to be able to use such spatial coordinates to generate or teach designated path routes or path curves extending two-dimensionally in space, it is also useful not only to place spatial coordinates in a row one after the other, but also to add further spatial coordinates in addition to a series of spatial coordinates.

Movements of grippers can be imaged even more varied in space if a set of spatial coordinates is used for the designated path routes or path curves, on the basis of which suitable designated path curves can also be generated at the same time.

If the designated path routes, in particular the designated path curves, are interpolated by means of individual spatial coordinates, precise path routes or path curves can also be re-sharpened with the aid of a computer after a sufficient number of spatial coordinates have been entered manually.

Any spatial coordinates can be entered in various ways at a laminating device or on a device periphery thereof. For example, such an input of spatial coordinates takes place as numerical inputs. Alternatively, locations are selected directly on a correspondingly prepared graphic representation of a laminating device, in particular a laminating room thereof, or selected on the input device.

It has also proved to be particularly advantageous if spatial coordinates are entered manually by means of an input device, in particular by means of a manual input device, such as a graphical surface of an input device.

Cumulatively or alternatively, it is advantageous if the designated path routes, in particular, designated path curves are taught by means of a manual sliding or wiping movement on and/or in front of a graphic surface of an input device. This also makes it easy to teach the desired designated path routes or path curves.

According to a third aspect, the aim of the present disclosure is also achieved by a method for teaching a method and/or a device for laminating a film element on a carrier part, wherein designated path routes, in particular, designated path curves along which grippers for gripping the film element, in particular at least one gripper jaw element thereof, are subsequently moved for laminating the film element, are taught by manual actuation of grippers.

Cumulatively or as an alternative to the first and second solution, grippers can also be moved manually, in the third solution proposed here, i.e. only manually, in order to teach suitable designated path routes or path curves.

In this respect, further advantageous method is that the grippers are manually guided to predetermined spatial coordinates and to be placed there manually at said spatial coordinates, enabling the designated path routes or path curves to be individually determined.

Through this teaching process, designated path routes or path curves can be generated significantly faster and more accurately than has previously been the case with pure programming in lamination processes. In particular, in the case of test runs, it is determined that gripper movements do not run optimally on the basis of previously generated programming.

According to a fourth aspect, the aim of the present disclosure is also achieved by a method for laminating a film element on a carrier part, wherein the film element is gripped by means of grippers, and in which grippers are motor-driven in each of their respective path routes, in particular, respective path curves in order to position the film element for a lamination process with respect to the carrier part, wherein the method is characterized in that grippers are least partially guided individually or combined into respectively designated path routes, in particular, designated path curves, order to teach designated path routes, in particular, designated path curves.

The fact that grippers, in particular of a laminating device, pass through a teach-in phase independently of a laminating process means that the corresponding grippers can be easily taught, in particular to designated path routes.

By means of the method proposed here according to the fourth aspect, in particular also in combination with one of the other proposed methods, an advantageous lamination method variant is available by means of which a film element to be laminated on a carrier part can be brought into effective contact with the carrier part in an improved manner and can then be laminated in such a way that a considerable saving in film material can be achieved as a result.

Among other things, this is also due to the fact that the grippers can grip the film element more closely at its laminating area during a later or the actual subsequent laminating process, whereby waste at the edge area of the film element can be significantly reduced.

Advantageously, a costly and complex programming process based on often estimated individual data regarding the path routes or path curves to be approached by grippers during the laminating process can be significantly simplified or, preferably, completely eliminated, whereby, in particular, a laminating process or a laminating device can be significantly simplified during a product change.

According to a fifth aspect, an object of the present disclosure is also solved by a method for or retrofitting a laminating method for laminating a film element and/or a laminating device for laminating a film element with grippers for gripping the film element, in which grippers used for mounting or retrofitting in the laminating method and/or in the laminating device are guided at least partially individually or combined into designated path routes, in particular, designated path curves, in order to teach designated path routes, in particular, designated path curves.

It is advantageous to teach particularly well-designed path routes or path curves before laminating a film element, especially in the integration of a retrofit or conversion.

By means of the further method proposed here according to the fifth aspect of the present disclosure, at least one further method variant is available which can be advantageously designed by means of the present teaching-in of particular path routes.

By means of the present disclosure, special grippers can be optimally taught in terms of their designated path routes before any laminating method and/or device is even put into operation at all.

In this respect, a lamination process is initially only simulated with regard to gripper positions.

At this point it should be mentioned that the term "lead" in the sense of the present disclosure means a movement or spatial movement or positioning of one or more grippers, individually or in groups, preferably initiated in an offset mode, for simulation purposes, for example.

Thus, a method variant provides that grippers are manually guided at least partially individually or combined into respective designated path routes, in particular, designated path curves. For example, grippers are manually gripped to teach their respective designated working position and manually guided or transferred for teaching to the designated working position.

Working positions can be realized in particular by end points of designated path routes or the like.

An even more effective and thus preferred method variant provides that grippers are driven, at least partially, individually or in combination, in the respective designated path routes, in particular, designated path curves, by means of a manually actuated control device. Here, the grippers can be guided not only by muscle force, but cumulatively or alternatively manually motor-assisted.

Such control devices can be implemented in a wide variety of ways. For example, such control devices include input devices for manual control of grippers.

Such manual control can be accomplished, for example, with a joystick element, with key elements, with a touch-sensitive surface for entering path lines or the like, and/or for entering spatial coordinates or the like.

It is particularly advantageous if the teaching provided in the context of the present disclosure on a laminating process and/or a laminating device takes place as a function of augmented reality devices, by means of which a laminating room is visualized and designated path routes or path curves for laminating a film element be displayed on a carrier part in the laminating room.

Grippers can be taught particularly precisely if grippers are guided at least partially individually or in combination along designated path routes, in particular designated path curves, and guided into designated working positions.

The present methods can be carried out particularly easily if grippers are guided without film or preferably with gripped film element at least partially individually or in combination along respectively designated path routes, in particular designated path curves. In particular, if the grippers grip a film element on a test basis, the interaction of the movement paths of the grippers can be recognized well.

It is useful if grippers are guided at least partially individually or in combination along designated path routes, in particular designated path curves, in order to teach designated path routes, in particular designated path curves, before gripping a film element to be laminated. In particular, designated path routes can be determined before a film element is laminated on a carrier part and taught, stored and kept ready for a subsequent laminating process.

It is therefore advantageous if grippers are guided at least partially individually or in combination into respectively designated path routes, in particular, designated path curves, in order to teach in respectively designated path routes, in particular, designated path curves, of the grippers prior to the lamination method and/or a laminating device.

The methods can be carried out in a particularly comprehensive manner if grippers are at least partially guided individually or in combination, along respectively designated path routes, in particular, designated path curves, in order to teach a control device for controlling a laminating method and/or a laminating device, in particular for controlling grippers, with regard to designated path routes, in particular, designated path curves.

In particular, by means of a relevant control device, the taught, designated path routes or path curves can be reproduced almost as often as desired on or in a laminating room.

In particular, the present disclosure can be used to teach a control associated with the laminating device for the automated movement of the grippers in the laminating process with regard to path routes or path curves to be traversed by grippers.

The film element can be laminated particularly gently in a laminating process if first grippers are guided along designated path routes, in particular on designated path curves, as a function of gripper movements, and other grippers are also guided along designated path routes, in particular on designated path curves. This also prevents collisions of individual grippers within a laminating room.

Movement paths of grippers within a laminating room can be further optimized if grippers are iteratively guided along a plurality of path routes, in particular on designated path curves, in order to ultimately teach designated path routes, in particular on designated path curves.

The methods can be further improved if first grippers are iteratively guided along a plurality of path routes, in particular on designated path curves, in dependence on gripper movements along designated path routes, in particular on designated path curves, of other grippers, in order to ultimately teach designated path routes or path curves.

In particular, the interaction between a carrier part movement within a laminating room and gripper movements within a laminating room can be further improved if grippers are guided, at least in part individually or in combination, as a function of a movement of a carrier part receptacle, in particular of a carrier part, in each case along designated path routes, in particular on designated path curves.

In particular, the present disclosure can be used to teach a control associated with the laminating device for the automated movement of the grippers in the laminating process with regard to path routes or path curves to be traversed by grippers.

If grippers are guided at least partially individually or in combination as a function of a multi-axial spatial movement of a carrier part receptacle, in particular of a carrier part, in each case along designated path routes, in particular on designated path curves, undesirable film stretching can be avoided more effectively.

If grippers are guided into designated path routes at least partially individually or in combination depending on the contour of a carrier part, especially designated path routes, in particular, designated path curves, can be taught even more precisely. This also makes it possible to cut film elements even more precisely, which allows film material to be saved even more effectively.

Further improvement of the proposed methods can be achieved by reading data, in particular 3D data, from a workpiece into a control device for controlling a laminating device, in particular for controlling grippers for gripping the film element, to teach from designated path routes, in particular on designated path curves.

If, for example, data or 3D data are available from a film element, a carrier part or a laminated component, the methods can be carried out even more precisely using this information.

Film blanks for film elements can be produced in a particularly small, film-material-saving manner and thus targeted manner and provided for lamination if grippers are at least partially guided individually or in combination to a sealing device of a vacuum room and/or other component of a laminating tool in order to teach designated path curves.

Alternatively, it is useful if grippers are at least partially individual or in combination up to a sealing device of a vacuum room, in particular up to 20 mm or up to 15 mm, preferably up to 5 mm or less, to a sealing device of a vacuum room and/or another component of a laminating tool in order to teach designated path routes, in particular on designated path curves.

A correspondingly small distance can reduce the risk of critical contact between, for example sealing slide elements of the sealing device of a laminating device and grippers of the laminating device during a laminating process, and yet grippers can still be placed very close to a vacuum room so that film elements can be cut to advantageously small sizes.

A further advantageous method variant provides that grippers are guided at least partially individually or in combination from predefined starting positions into respectively designated working positions. Basically, the grippers can be guided from any starting position into designated working of the laminating device.

However, later starting lamination processes can be carried out even more reliably or more precisely if grippers from predefined starting positions are moved to designated working positions.

At this point, it should be explicitly pointed out that advantageously designated path routes, in particular on designated path curves, are offset, whereby teaching in the sense of the present disclosure can take place in advance of an actual machine and automated lamination process.

According to a sixth aspect, the aim of the present disclosure is achieved by a device for laminating a film element with grippers for gripping the film element and by a control device for controlling a motor-driven method of grippers in their respective path routes, in particular on designated path curves, whereby the device is characterized by a control device for carrying out the method described here.

By means of the laminating device, the respective method for teaching designated path routes or path curves of grippers can be easily carried out before the actual laminating process and real laminating processes can then be carried out thereon. By means of the correspondingly designated laminating device, a laminating process with regard to gripper positions is therefore initially only simulated.

In the sense of the present disclosure, the term "laminating device" describes any device by means of which a film element can be laminated onto a carrier part to form a laminated component. Such a laminating device relates in particular to a vacuum laminating device, but can also relate to other laminating machines.

According to a seventh aspect, the aim of the present disclosure is also achieved by a teaching station for teaching designated path routes, in particular on designated path curves, for grippers for gripping a film element, with grippers and/or with gripper dummies, and with a control device for controlling the teaching station, in particular the gripper and/or the gripper dummies, wherein the teaching station is characterized by a control device for carrying out the present method.

By means of the present teaching station, the respective method for teaching designated path routes of grippers can be carried out independently of a laminating device and the determined designated working positions can be carried out in a corresponding control device, in particular a laminating device for later retrieval. This means that a laminating device is ready for use again significantly faster, especially after a product change.

By means of the teaching station, a lamination process is preferably simulated with regard to gripper positions within a lamination room, but no real lamination process is subsequently carried out.

Furthermore, grippers at the present teaching station are more easily accessible due to the complexity of the teaching station, which makes manual guiding of the grippers into designated path routes or path curves even easier.

Preferably, the teaching station has a simulation room in which the grippers can be guided.

The simulation room preferably corresponds to a laminating room of a laminating device.

In order to freely switch grippers for guiding to designated path routes in a laminate room, it is advantageous that the control device comprises means for releasing grippers.

Both the device for laminating and the teaching station each embody an advantageous teaching device for teaching in particular designated path routes or path curves of a corresponding laminating process, which can also be integrated into a processing line of a system for producing laminated components.

The device or the teaching station can be advantageously operated for teaching designated path routes or path curves if the control device comprises a redundant control device. By means of the redundant control device, grippers can be guided into designated path routes or path curves for example, independently of control devices installed in a laminating machine or the like.

For example, a correspondingly configured redundant control device has a mirrored display of a stationary output device of the device or of the teaching station.

It is particularly useful for operating the device or the teaching station or for carrying out the present method if such a redundant control device is mobile.

In this respect, an advantageous embodiment provides that the control device comprises a mobile input device, in particular a handheld device. A suitable handheld device can be in particular a laptop, a tablet or the like, but also a smartphone or similar.

If the control device comprises a keyboard control, a touch screen control, a joystick control or the like, grippers can be guided into designated path routes or path curves in a motor-assisted manner by means of human interaction particularly easily.

In any case, the introduction of grippers takes place in particular in working positions and/or along designated path routes or path curves within a laminating room, in the sense of the present disclosure, by interaction of an operator carrying out the respective laminating method.

A preferred embodiment further provides that the control device comprises an interface for receiving and processing data of a carrier part to be laminated and/or a film element, whereby designated path routes or path curves can be advantageously determined and taught by the control device on the basis of data determined therefrom, in particular CAD data.

It is useful if the interface can receive and process structural data, in particular CAD data, unwinding data, free-form surface data or the like of a film element to be laminated, a carrier part to be laminated and/or a carrier part receptacle. This allows designated path routes or path curves to be determined and taught even more accurately.

Furthermore, it is also advantageous if the interface is designed to receive and process structural data, in particular CAD data, of a laminating room, in particular a vacuum room of the laminating room, a sealing device of the laminating room, a cutting device of the laminating room or the like. This also allows designated path routes or path curves to be determined and taught more accurately.

A further very advantageous embodiment variant provides that designated path routes, in particular on designated path curves are dependent on a vacuum room, in particular an outer contour of a vacuum room, can be determined and taught. As a result, designated path routes or path curves can be further optimized, taking into account spatial conditions in a laminating room of a laminating device, especially with respect to a vacuum room of a laminating device.

The vacuum room and in particular an outer contour, preferably a changeable outer contour, of the vacuum room can be advantageously displaced within the laminating room, in particular height-shifted.

Cumulatively or alternatively, it is advantageous if designated path routes, in particular on designated path curves are determined and taught as a function of designated position positions, in particular of variable position positions, of sealing elements of a sealing device and/or of cutting elements of a cutting device. Designated path routes or path curves can also be further optimized in this way, taking into account spatial conditions on a sealing device and/or a cutting device of a laminating device. This is of particular advantage on a laminating device, since such devices or components or component groups thereof are arranged extremely close together in a laminating room or on a vacuum room so that especially precisely matched designated path routes or path curves can further improve a lamination process.

A further advanced embodiment provides that designated path routes, in particular on designated path curves can be determined and taught as a function of a designated dynamic laminating movement of a carrier part receptacle and/or a carrier part. As a result, a film element to be laminated and a carrier part to be laminated therewith can be placed within a laminating room in an even more individual, dynamic and thus even better matched to one another, so that a lamination process can be further individualized. Thus, it is also advantageous if designated path routes, in particular on designated path curve can be determined or taught as a function of a preferably multidimensionally manipulable travel path of a carrier part receptacle or a carrier part.

If cumulatively or alternatively designated path routes, in particular on designated path curves can be determined and taught as a function of a distance, in particular an individually adjustable distance, between an edge contour of a film element and an outer contour of a vacuum room, and/or sealing elements of a sealing device, and/or cutting elements of a cutting device, favorable film material savings and/or improved laminating results can also be achieved.

In any case, it is advantageous if designated path routes, in particular on designated path curves can be determined and taught as a function of, in particular, closing movements of a laminating tool, preferably of closing movements of a lower tool of the laminating tool and/or of an upper tool of the laminating tool, whereby, in particular, the present laminating processes can be improved.

According to an eighth aspect, the object of the present disclosure is also achieved by a film element for laminating onto a carrier part, the film element having an outer contour, and the outer contour of the film element being generated as a function of data of a carrier part contour of a carrier part.

If the outer contour of the film element is dependent on a carrier part contour, it can be produced, the film element can be packaged in an exceptionally saving manner and thus more precisely and also scarce, whereby waste of film material can be significantly reduced or ideally minimized.

This can be laminated Components with a significantly reduced material expenditure and therefore cost-saving and more economical to manufacture.

The film element can be matched even more precisely to the carrier part to be laminated if the film element has a circumferential edge contour, the circumferential edge contour being generated as a function of data of a carrier part contour of a carrier part.

If the data of the carrier part contour include structural data, in particular CAD data, processing data, free-form surface data or the like of the carrier part, not only can the film element be made more scarce with regard to the carrier part, but also, depending on such structural data, also designated path routes or path curve can be better determined and taught in the sense of the present disclosure.

It goes without saying that features of the solutions described above or in the claims can also be combined, if necessary, in order in particular to be able to implement the advantages and effects which can be achieved in accordance with the present disclosure.

At this point it should also be mentioned that within the scope of the present patent application, the expression "in particular" should always be understood in such a way that an optional, preferred feature is introduced with this expression. The expression is not to be understood as "and" and not as "namely".

Furthermore, it should be pointed out that in the context of the present patent application, indefinite articles and indefinite numbers such as "one . . . ", "two . . . " etc. should generally be understood as at least information, i.e. as "at least one" . . . "," at least two . . . etc., unless it is clear from the context or the specific text of a particular passage that it means only "exactly one . . . ", "exactly two . . . " etc. should be.

Furthermore, it should also be claimed that the methods described can also be supplemented by further technical features described here, in particular by features of the device, in order to advantageously further develop the methods or to be able to represent or formulate method specifications even more precisely, or vice versa.

It should also be explicitly stated that the present disclosure relates to a real or simulated lamination room, on or in which existing designated path routes, in particular on designated path curves are generated.

In addition, further features, effects and advantages of the present disclosure are explained with reference to the attached drawing and the following description, in which, by way of example, a device for laminating a film element onto a carrier part is illustrated and described.

BRIEF DESCRIPTION OF THE SEVERAL VIEWS OF THE DRAWINGS

Further advantages features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure.

In the following, advantageous examples of embodiments of the present disclosure and the inventions described herein are explained with reference to the accompanying figures, wherein:

FIG. 1 depicts schematically a view of a device for laminating a film element on a carrier part with a plurality of grippers;

FIG. 2 schematically depicts a supervision of a teaching station with a laminating room and with a large number of grippers;

DETAILED DESCRIPTION OF THE INVENTION

Figure 3:
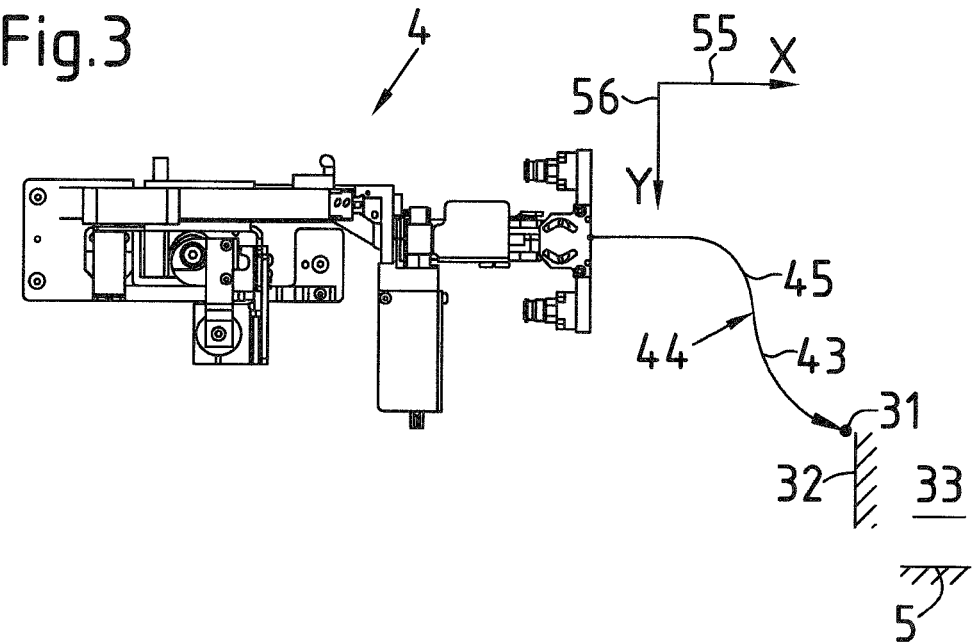
FIG. 3 schematically depicts a top view of a gripper of the one shown in FIGS. 1 and 2 device or teaching station.

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of" "A, B, and C" should be understood as including only one of A, only one of B, only one of C, or any combination of A, B, and C.

According to the illustration in FIG. 1, a first possible exemplary embodiment of a device 1 for laminating a film element 2 is shown.

The device 1 comprises a frame part 3 with a plurality of motor-driven grippers 4. Alternatively, the motor-driven grippers 4 can also be held independently of a common frame part 3 on the device 1.

The device 1 is further characterized by a laminating tool 5 with a lower tool 6 and with an upper tool 7.

The lamination tool 5 has a lamination room 8, in which a lamination process or a lamination process takes place.

The frame part 3 and thus also the grippers 4 are mounted height-adjustable in a frame 11 of the device 1 by means of a travel mechanism 10, so that the entire frame part 3 is mounted on the frame 11 in a height-adjustable manner along a vertical displacement axis 12 of the device 1.

Below the frame part 3 on a bottom part 13 of the frame 11, the lower tool 6 is placed, the lower tool 6 comprising one or more molded shell parts 14, which in turn are arranged on a base 15 of the bottom part 13.

The upper tool 7 comprises a carrier part receptacle 16, by means of which one or more carrier parts 17 to be laminated can be held on the upper tool 7. The upper tool 7 also has a robot device 20 with a multi-axially movable manipulator 21, to which the carrier part receptacle 16 is fastened. The carrier part receptacle 16 can be brought into the laminating room 8 by means of the multi-axially movable manipulator 21. In particular, the carrier part receptacle 16 can be moved multidimensionally within the laminating room 8, in particular also adjustable in height.

In addition, the device 1 also has a feed and/or insertion device 23, by means of which one or more film elements 2 can be introduced into the frame part 3, in such a way that the film element 2 can be immediately inserted into the open gripper 4.

The feeding and/or inserting device 23 has a feeding and/or inserting section 24, along which the respective film element 2 can be fed starting from a loading position 25 into the gripper 4.

The feed and/or insertion device 23 is also characterized by at least one movable heating unit 26 for heating the respective film element 2 outside the frame part 3. The movable heating unit 26 has two heating devices 27 and 28, which can be moved along with the film element 2 to be introduced in the direction of the cutting room 8.

Figure 4:
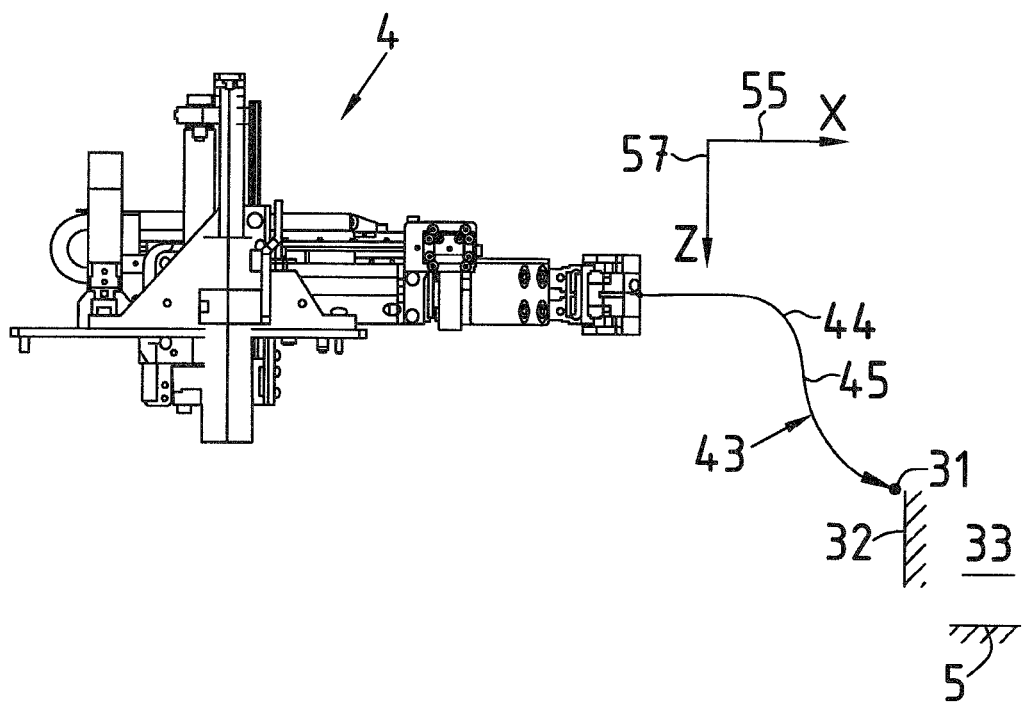
FIG. 4 schematically depicts a side view of the gripper shown in FIG. 3.

Furthermore, the device 1 has a control device 30 comprising a data interface for motorized movement of the grippers 4 along respective path routes 43 or path curves 44 and in their respective working positions 31 (numbered here only as an example, see also FIGS. 2 to 4). The working position 31 shown here characterizes, purely by way of example, an end position (not numbered again) of a gripper 4 next to a sealing device 32 (see FIGS. 3 and 4) for sealing a vacuum room 33 (see FIGS. 3 and 4) or besides another one not explicitly here shown and numbered component of the laminating tool 5. The path route 43 or path curve 44 shown is only shown as an example.

An alternative clamping device is shown in FIG. 2, where a teaching station 35 for teaching designated working positions 31 and path routes 43 or path curves 44 (see FIGS. 3 and 4) for grippers 4 for gripping a film element 2 is shown. It goes without saying that dummy grippers can also be used in such a teaching station 35, since no real lamination processes take place at the teaching station 35.

The teaching station 35 has a frame 36, by means of which the grippers 4 are mounted on longitudinal cross members 37 and cross members 38 of a frame part 39 in a multi-axially movable manner.

The frame part 39 or the frame 36 convert a simulation room 40 accessible from above and below, in which the grippers 36 can be guided, the simulation room 40 corresponding to the lamination room 8 of the device 1.

The teaching station 35 has a control device 30 for controlling the grippers 4, this control device also having a data interface (likewise not shown here) in the sense of the present disclosure.

Using the teaching station 35, the grippers 4 and in particular the control device 30 can be taught on designated path curves 44 and working positions 31, for this purpose the grippers along trajectories 45 (numbered only as an example, cf. also FIGS. 3 and 4) to the respectively designated working positions 31 can be performed. Subsequently, the designated working positions 31, but also the movement paths 45 as are stored as a path 43 or path curve 44 by the control device 30 and are available as a data record for a device 1 for laminating a film element 2 on a carrier part 17.

It goes without saying that 35 different teaching methods can be carried out both by means of the device 1 and by means of the teaching station 35.

In this case, the grippers 4 can be guided at least partially individually or in combination into each designated path routes 43 or path curves 44 and can be led and manually into each designated working position 31.

Cumulatively or alternatively, the grippers 4 can be guided by means of a manually operated control device 46 by motor, at least in part individually or in combination, along designated path routes 43 or path curves 44 into designated working positions 31.

For this purpose, both the device 1 and the teaching station 35 each have a corresponding redundant control device 46, which in this embodiment is designed as a mobile input device 47. This allows an operator 48 (only shown in FIG. 1) move freely on the device 1 or the teaching station 35 while he manually guides the gripper 4.

More precisely, the input device 47 is a handheld device (not again with reference number) with a joystick control 50, so that the operator 4 grips the gripper 4 with the aid of drive motors (not numbered), the gripper 4 can be very precisely along designated path routes 43 or path curves 44 manually lead into the respective working positions 31.

Cumulatively or alternatively, the grippers 4 can be guided at least in part individually or in combination along designated path routes 43 or path curves 44 by means of individual spatial coordinates and can be guided into designated working positions 31.

Cumulatively or alternatively, the grippers 4 can be guided by CAD data of the carrier part 17 and/or the film element 2, at least in part, individually or in combination by motor along designated path routes 43 or path curves 44 and guided into respectively designated working positions 31, designated intermediate positions and/or designated end positions. Corresponding CAD data can be processed by means of the data interface of the control device in the sense of the present disclosure.

FIG. 3 shows both the horizontal forward movement 55 (x-axis) and a horizontal sideways movement 56 (y-axis) of the gripper 4 along the movement path 45 and into the designated working position 31, which in a later real lamination process an end position of the gripper 4.

FIG. 4 also shows the horizontal forward movement 55 (x-axis) as well as a vertical downward movement 57 (z-axis) of the gripper 4 along the movement path 45 and into the designated working position 31.

Figure 5:
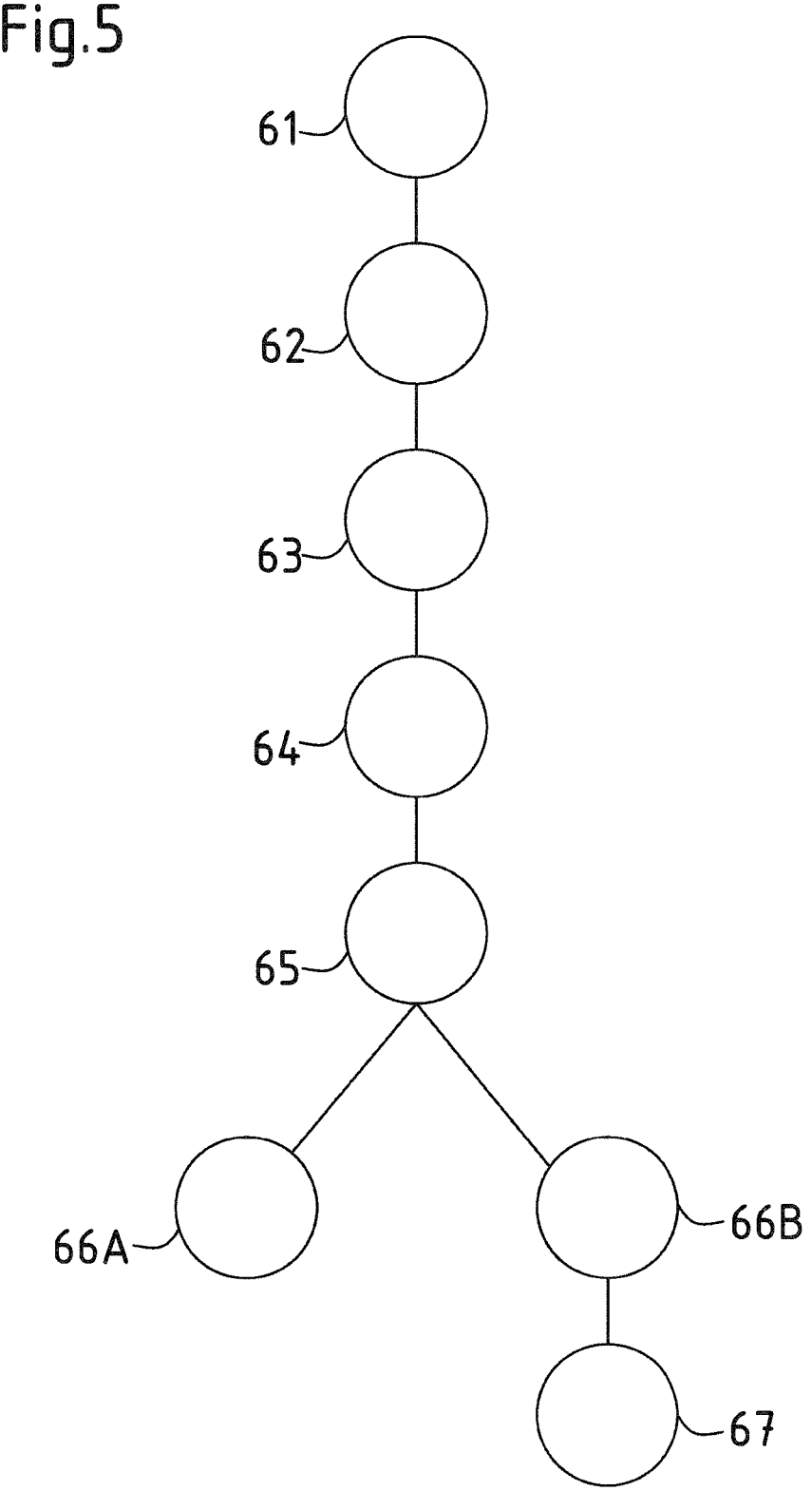
FIG. 5 schematically depicts a first conceivable process sequence for teaching designated path routes on a laminating device.

According to the illustration according to FIG. 5, a flow chart 60 is also exemplarily illustrated with a possible process sequence for teaching designated working positions 31 for grippers 4 of the device 1.

In a first method step 61, the grippers 4 are in their respective starting position 54, which can be predetermined or random.

In a second method step 62, drive motors or the like of the grippers 4 are released, so that the grippers 4 are free to move and can be guided in the sense of the present disclosure.

In a third method step 63, grippers 4 are preferably guided individually and manually along designated path routes 43 or path curves 44 and guided into their designated working positions 31. The designated path routes 43 or path curves 44 are tracked or detected.

In a fourth method step 64, these designated path routes 43 or path curves 44 and the designated working positions 31 are detected and stored by the control device 30. The control device 30 has now been taught in particular.

In a fifth method step 65, the grippers 4 taught in this way are moved back from their designated working positions 31, for example into their respective starting position 54.

In a sixth process step 66A, the actual lamination process is started in real life without a previous test run.

Or in an alternative sixth method step 66B, the taught grippers 4 first run through a test run in the device 1 with regard to a real laminating process.

In a seventh method step 67, the actual lamination process can actually be started after a successful test run.

The laminating device 1 or teaching station 35 shown here by way of example, as well as the exemplary flow chart 60 can, with suitable adaptation, implement all of the design and process variants described here, where the description of the figures described in detail in this regard is dispensed with in order to avoid repetition.

It goes without saying that the exemplary embodiments explained above are merely first embodiments of the present disclosure. In this respect, these examples do not limit the present disclosure.

At this point, it should again be explicitly pointed out that features of the solutions described above or in the claims and/or figures can also be combined, if appropriate, in order to be able to implement or achieve the described or further features, effects and advantages in a correspondingly cumulative manner.

All the features disclosed in the application documents are claimed as essential to the present disclosure, provided that they are new to the prior art, individually or in combination with one another.

The invention claimed is:

1. A method for at least one of teaching a laminating method and operating a laminating device for the laminating of a film element on a carrier part, comprising the steps of:
   determining and teaching in which of the at least one designated path routes and designated path curves along which grippers configured for gripping the film element and later for lamination of the film element via a use of at least one of CAD data of the carrier part and the film element; and
   wherein the grippers are configured to be at least one of moved and guided by manual force.

2. The method according to claim 1, wherein the CAD data comprises at least one data record relating to at least one of a shape and a contour, such that the shape and the contour comprise a development of a surface or the carrier part to be laminated.

3. The method according to claim 1, wherein at least one of the designated path routes and designated path curves, depending on a shape, are determined and taught on an outer contour or an edge contour of the film element.

4. The method according to claim 1, further comprising the steps of: teaching by means of individual coordinates in which at least one of designated path routes and designated path curves, along which at least one of grippers configured for gripping the film element and at least one gripper jaw element of the grippers, are configured for later laminating the film element.

5. The method according to claim 4, wherein at least one of the designated path routes and the designated path curves are taught by means of at least one of at least two spatial coordinates, a starting point, an end point, and a plurality of intermediate waypoints.

6. The method according to claim 4, wherein at least one of the designated path routes and the designated path curves are interpolated by means of individual spatial coordinates.

7. The method according to claim 4, wherein spatial coordinates are entered manually by means of at least one of an input device, a manually guided input device and a graphical surface of an input device.

8. The method according to claim 4, wherein at least one of the designated path routes and the designated path curves are taught by means of a manual sliding or wiping movement on and/or in front of a graphic surface of an input device.

9. A method for at least one of teaching a laminating process and operating a laminating device for the laminating of a film element on a carrier part, the method comprising the steps of:
   teaching by manual actuation of grippers configured for gripping at least one of the film element and at least one gripper jaw element, and later moved for laminating the film in which at least one of designated path routes and designated path curves, along which the grippers are later moved for laminating the film element; and
   wherein the grippers are configured to be at least one of moved and guided by manual force.

10. The method according to claim 9, wherein the grippers are configured to be manually guided to predetermined spatial coordinates.

11. The method according to claim 1, wherein the grippers are configured to be manually moved at least partly individually or in combination along at least one of designated path routes and designated path curves.

12. The method according to claim 1, wherein the grippers are configured to be at least partially guided individually or in combination along at least one of the designated path routes and the designated path curves, in a motor-driven manner by means of a manually operated control device.

13. The method according to claim 1, wherein the grippers are configured to be guided at least partially individually or in combination along at least one of the designated path routes and the designated path curves, and are guided into respectively designated working positions.

14. The method according to claim 1, wherein the grippers are configured to be guided without film or with a gripped film element, at least partially individually or in combination, along at least one of the designated path routes and the designated path curves.

15. The method according to claim 1, wherein the grippers are configured to be guided at least partially individually or in combination along at least one of the designated path routes and the designated path curves to enable the teaching about at least one of the designated path routes and the designated path curves of the grippers prior to start of at least one of the laminating method and the laminating device.

16. The method according to claim 1, wherein the grippers are configured to be guided at least partially individually or combined along at least one of the designated path routes and the designated path curves, to enable the teaching of a control device configured for controlling at least one of the laminating method and the laminating device and for controlling the grippers with regard to at least one of the designated path routes and the designated path curves.

17. The method according to claim 1, wherein the first grippers are configured to be guided in dependence on gripper movements along at least one of designated path routes and designated path curves, and other grippers are configured to be guided along at least one of designated path routes and designated path curves.

18. The method according to claim 1, wherein the grippers are configured to be guided iteratively along at least one of a plurality of path routes and designated path curves, in order to teach at least one of the designated path routes and designated path curves.

19. The method according to claim 1, wherein the first grippers are configured to be iteratively guided along at least one of a plurality of path routes and designated path curves, in dependence on gripper movements along at least one of the designated path routes and the designated path curves, of other grippers, in order to teach at least one of the designated path routes and the designated path curves.

20. The method according to claim 1, wherein the grippers are configured to be guided at least partially individually or in combination as a function of at least one of a movement of a carrier part receptacle and of a carrier part, in each case along at least one of the designated path routes and the designated path curves.

* * * * *